United States Patent [19]

Kawamoto

[11] Patent Number: 4,484,966
[45] Date of Patent: Nov. 27, 1984

[54] PROCESS OF AND APPARATUS FOR MANUFACTURING CARCASS BAND FORMING PART OF RADIAL TIRE

[75] Inventor: Hisao Kawamoto, Akigawa, Japan

[73] Assignee: Bridgestone Tire Company Limited, Tokyo, Japan

[21] Appl. No.: 438,461

[22] Filed: Nov. 2, 1982

[30] Foreign Application Priority Data

Nov. 9, 1981 [JP] Japan .................. 56-179245

[51] Int. Cl.³ ............................. B29H 17/02
[52] U.S. Cl. .............................. 156/126; 138/174; 156/133; 156/156; 156/167; 156/244.12; 156/244.14; 264/173; 264/174; 264/514; 264/565
[58] Field of Search ............ 156/126, 127, 133, 149, 156/156, 166, 167, 244.12, 244.13, 244.14; 138/138, 174; 264/514, 565, 173, 174

[56] References Cited

U.S. PATENT DOCUMENTS

3,183,135 5/1965 Berquist ..................... 156/126
4,283,241 8/1981 Hollmann ................. 156/126 X
4,359,354 11/1982 Böhm ........................ 264/173 X

*Primary Examiner*—William A. Powell
*Assistant Examiner*—Thomas Bokan

[57] ABSTRACT

A process of manufacturing carcass bands which are reinforced by cords and are to be employed in fabricating a radial tire. The process includes the steps of unwinding a plurality of cords from a plurality of reels, respectively, travelling the cords through apertures formed in guide members and entering a rubber coating mechanism, coating the cords with rubber material by means of the rubber coating mechanism to produce incessantly a cylindrical tube having the cords embedded therein, storing the cylindrical temporarily between its leading end portion and the rubber coating mechanism, receiving the leading end portion of the cylindrical tube on an axially elongated retaining member having rear and front ends, retaining the leading end portion of the cylindrical tube and moving the leading end portion retained by means of a first retaining mechanism to a position in which the cylindrical tube is severed, severing the cylindrical tube into a predetermined length from the leading end thereof while producing incessantly the cylindrical tube and storing temporarily the tube between the rubber coating mechanism and the rear end of the axially elongated retaining member, and taking out from the axially elongated retaining member the severed tube while producing incessantly the cylindrical tube and storing temporarily the tube between the rubber coating mechanism and the rear end of the axially elongated retaining member.

4 Claims, 13 Drawing Figures

PROCESS OF AND APPARATUS FOR MANUFACTURING CARCASS BAND FORMING PART OF RADIAL TIRE

FIELD OF THE INVENTION

The present invention relates to a process of and an apparatus for manufacturing carcass bands which are reinforced by cords and are to be employed in fabricating a radial tire.

SUMMARY OF THE INVENTION

In accordance with one important aspect of the present invention, there is provided a process of manufacturing carcass bands which are reinforce by cords and are to be employed in fabricating a radial tire, comprising of the steps of (1) unwinding a plurality of cords from a plurality of reels, respectively, (2) travelling the cords through apertures formed in guide members and entering a rubber coating mechanism, (3) coating the cords with rubber material by means of the rubber coating mechanism to produce incessantly a cylindrical tube having the cords embedded therein, (4) storing the cylindrical tube temporarily between its leading end portion and the rubber coating mechanism, (5) receiving the leading end portion of the cylindrical tube on an axially elongated retaining member having rear and front ends, (6) retaining the leading end portion of the cylindrical tube and moving the leading end portion retained by means of a first retaining mechanism to a position in which the cylindrical tube is severed, (7) severing the cylindrical tube into a predetermined length from the leading end thereof while producing incessantly the cylindrical tube and storing temporarily the tube between the rubber coating mechanism and the rear end of the axially elongated retaining member, and (8) taking out from the axially elongated retaining member the severed tube while producing incessantly the cylindrical tube and storing temporarily the tube between the rubber coating mechanism and the rear end of the axially elongated retaining member.

In accordance with another important aspect of the present invention, there is provided an apparatus for manufacturing carcass bands which are reinforced by cords and are to be employed in fabricating a radial tire, comprising a plurality of reels having the cords wound thereon, a roller for gathering the cords and turning the movement direction of the cords, control rollers for maintaining the cords even in tension and preventing the cords from twisting, a plurality of guide members each formed with apertures having the cords passed therethrough, a rubber coating mechanism for coating the cords with rubber material to produce a cylindrical hose having the cords embedded therein, a retaining pipe partially receiving cylindrical hose thereon, a pair of retaining mechanisms movable axially of the retaining pipe and for retaining the cylindrical hose, a severing machine for severing the cylindrical hose into a predetermined length, and two pair of clamp members for clamping fixedly the retaining pipe.

BRIEF DESCRIPTION OF THE DRAWINGS

The features and advantages of a process of and an apparatus for manufacturing a carcass band forming part of a radial tire according to the present invention will be appreciated from the following description taken in conjunction with the accompanying drawings in which.

DESCRIPTION OF THE PRIOR ART

A prior-art process of manufacturing a carcass band forming part of a radial tire has so far been carried out through the following steps. In the first step, a plurality of cords are initially arranged substantially in parallel and spaced relationship to one another with respect to a certain plane and are thereafter coated with rubber material by means of rubber coating rollers to produce a coated cord having embedded therein a plurality of cords. The coated cord is then severed into predetermined lengths at right angles with respect to longitudinal direction thereof. The longitudinal end portions of the cords severed into predetermined lengths are spliced to one another to produce a rubberized cord fabric having a plurality of cords embedded therein vertically with respect to the longitudinal direction thereof. The rubberized cord fabric is thereafter wound on a winding roll which is then placed in the vicinity of a tire building drum. The rubberized cord fabric is then unwound from the winding roll to be wound on the periphery of the tire building drum by an attendant operator in such a manner that the opposite ends of the rubberized cord fabric are severed into a predetermined length substantially equal to the circumferential length of the tire building drum and are overlappedly jointed to produce a carcass band. The carcass band thus produced by the previously mentioned process in the prior art process are however to have two jointed portions. One of the jointed portions is produced in the step that the longitudinal end portions of the coated cords severed into predetermined lengths are spliced to one another to produce the rubberized cord fabric having a plurality of cords embedded therein vertically with respect to the longitudinal direction thereof, while the other is produced in the step that the opposite ends of the rubberized cord fabric cord are severed into a predetermined length substantially equal to the circumferential length of the tire building drum and are overlappedly jointed by the attendant operator. As a consequence, each of the carcass bands does not have an even surface throughout its whole length, thereby causing the deterioration of the performances of finished radial tires. This results in the fact that an extremely expensive apparatus and skillful persons are necessitated for production of high quality carcass bands forming part of radial tires. The more adjacent to each other two jointed portions formed in the carcass band are located, the more deteriorated are the performances of the radial tires. For this reason, the carcass band is required to be partly severed and discarded, thereby making the finished radial tires even costly.

In order to overcome such problems as described above, there has been proposed another prior-art process in which a cylindrical reinforcement hose produced in advance in a hose production line is directly supplied to a carcass drum to which the reinforcement hose is fitted to and the reinforcement is then severed into predetermined lengths by a suitable severing apparatus. Difficulties are however encountered in that the hose production line is required to be stopped when the reinforcement hose is not directly supplied to the carcass drum to which the hose is fitted. This results in lowering operational efficiency of the hose production line. In addition, there occur other difficulties in that the reinforcement hose intermittently produced are reduced to be not uniform in quality as compared with that incessantly produced.

The present invention contemplates provision of a process of and an apparatus for manufacturing a carcass band forming part of a radial tire, eliminating all the above described problems that have thus far been inherent in the prior-art processes.

It is, accordingly, an important object of the present invention to provide a process of manufacturing a carcass band forming part of a radial tire and an apparatus therefor in which carcass bands are manufactured with a high quality.

It is another important object of the present invention to provide a process of manufacturing a carcass band forming part of a radial tire that is incessantly carried out with a high operational efficiency without stopping the apparatus for manufacturing the carcass band.

DESCRIPTION OF THE PREFERRED EMBODIMENTS

Figure 1:
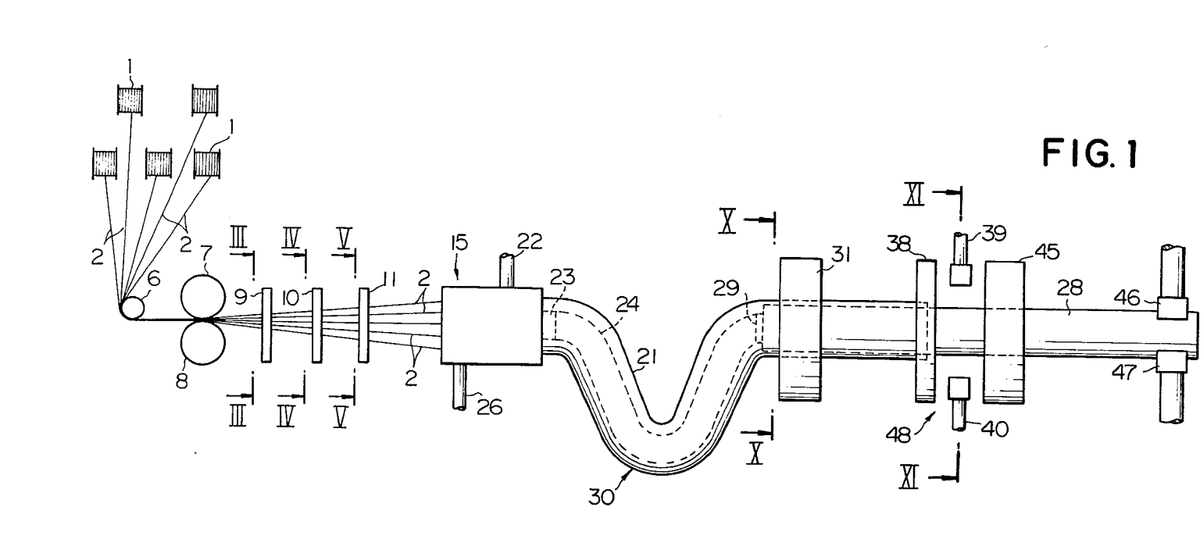
FIG. 1 is a schematic view showing arrangements of members and mechanisms which are employed in the process of manufacturing a carcass band forming part of a radial tire according to the present invention.
Figure 2:
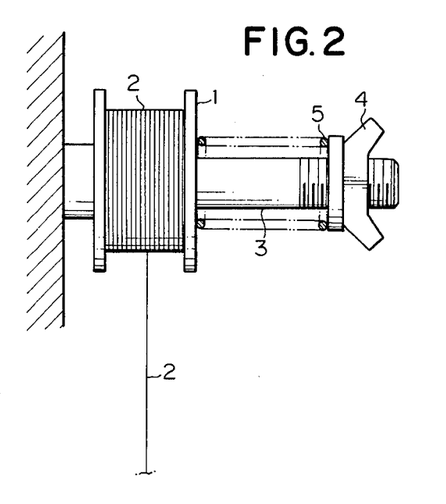
FIG. 2 is a side view showing, to an enlarged scale, the construction and arrangement of the reel illustrated in FIG. 1.
Figure 3:
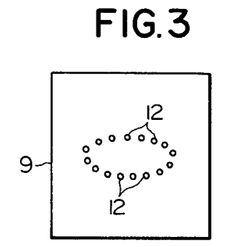
FIGS. 3, 4 and 5 are front views showing, to an enlarged scale, the arrangement of apertures formed in guide members and viewed from planes indicated by lines III—III, IV—IV and V—V in FIG. 1, respectively.
Figure 4:
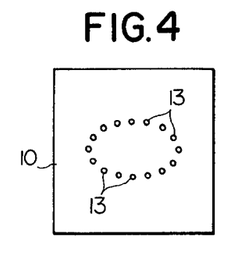
Figure 5:
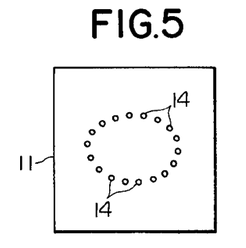
Figure 6:
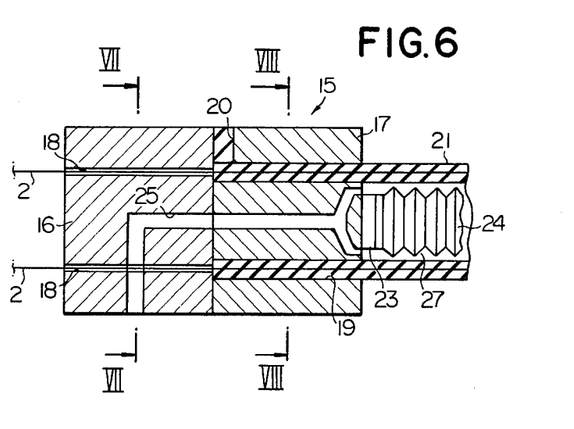
FIG. 6 is a fragmentary longitudinal cross sectional view showing, to an enlarged scale, portions of a rubber coating mechanism illustrated in FIG. 1.
Figure 7:
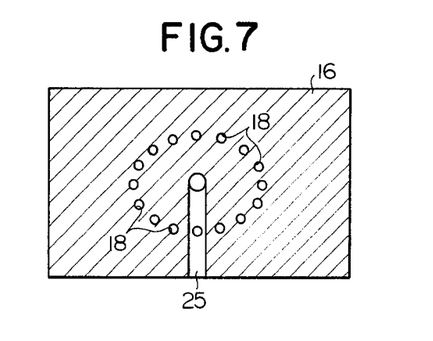
FIG. 7 is a cross sectional view showing apertures and air passageway formed in the rubber coating mechanism and viewed from a plane indicated by line VII—VII in FIG. 6.
Figure 8:
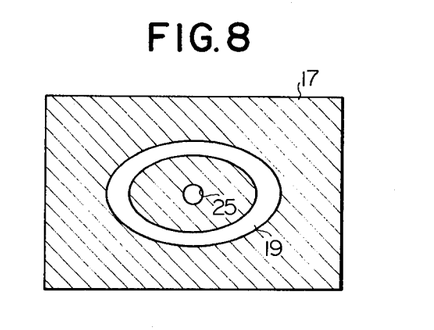
FIG. 8 is a cross sectional view showing air and rubber passageways formed in the rubber coating mechanism and viewed from a plane indicated by line VIII—VIII in FIG. 6.
Figure 9:
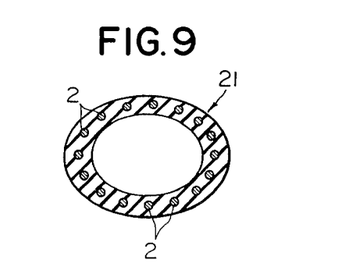
FIG. 9 is a cross sectional view of a cylindrical hose having cords embedded therein to be employed for manufacturing a carcass band according to the present invention.
Figure 10:
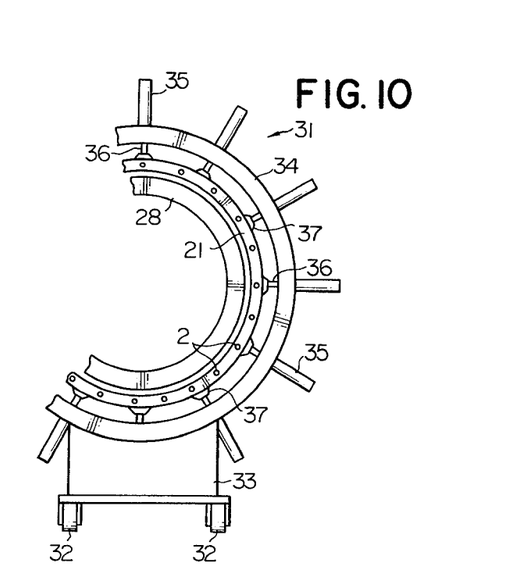
FIG. 10 is a fragmentary cross sectional view, to an enlarged scale, of a retaining mechanism and viewed from a plane indicated by line X—X in FIG. 1.
Figure 11:
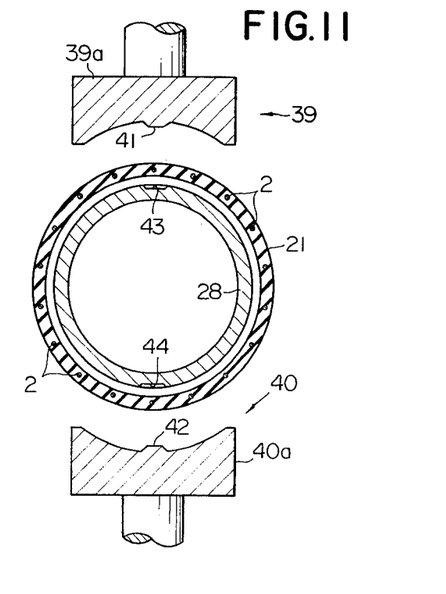
FIG. 11 is a fragmentary cross sectional view showing retaining members, the cylindrical hose and a retaining pipe and viewed from a plane indicated by line XI—XI in FIG. 1.

Referring to FIG. 1 of the drawings, there is shown an apparatus which puts into practice a process of manufacturing a carcass band of a radial tire according to the present invention. Designated by numeral 1 are a plurality of reels 1 respectively having wound thereon a plurality of cords 2 which are to be employed in reinforcing a carcass band of a radial tire. As shown in FIG. 2, each of the reels 1 is rotatably supported on a first support member 3 having at its one end a base portion fixedly secured to a stationary structure, and at its the other end a threaded portion engaging with a clumping nut 4. Between the clumping nut 4 and the reel 1 is interposed a compression coil spring 5 so that the reel 1 is biased by the compression coil spring 5 toward the base portion of the support member 3. As a consequence, the reel 1 is prevented from rotating freely under the influence of the torque resulting from the biasing force of the compression coil spring 5. Turning back to FIG. 1 the cords 2 unwound from the respective reels 1 are caused to gather at a first roller 6 to turn at right angles the movement direction of the cords. A pair of control rollers 7 and 8 are arranged in opposing and contacting relationship to each other downstream of the first roller 6 and have thus cords 2 passed therethrough in such a manner that the cords 2 are maintained even in tension and are prevented from twisting. Downstream of the control rollers 7 and 8 are positioned guide members 9, 10 and 11 which are arranged in spaced and substantially parallel to one another in the movement direction of the cords 2 and which are formed with apertures 12, 13 and 14 arranged in the form of an ellipse (see FIGS. 3 to 5), respectively, each having each of cords 2 passed therethrough. Each of the cords 2 travelling through each of the apertures 12, 13 and 14 formed in the guide members 9, 10 and 11, respectively, is able to smoothly enter a rubber coating mechanism 15 which comprises a first block 16 and a second block 17 coupled with each other as shown in FIGS. 6 to 8. The first block 16 is formed with a plurality of cord passageways 18 extending axially therethrough and having the plurality of cords 2 respectively passed therethrough. The cord passageways 18 are also arranged in the form of an ellipse like the elliptical arrangement of the apertures 12, 13, 14 in the guide members 9, 10 and 11 so that the cords 2 travelling through the guide member 11 can enter smoothly the cord passageways 18. In the event that the cord passageways 18 formed in the first block 16 of the rubber coating mechanism 15 are arranged in the form of a circle, the cords are to be travelled through apertures 12, 13 and 14 arranged in the guide members 9, 10 and 11 in the form of the circle so as to be able to smoothly enter a rubber coating mechanism 15. The second block 17 is formed with a rubber passageway 19 extending axially therethrough and communicating with the exits of the cord passageways 18 formed in the first block 16. This results in that each of the cords 2 passes through the rubber passageway 19 immediately after passing through the cord passageways 18. Into the rubber passageway 19 a rubber material is fed substantially vertically with respect to the movement direction of the cords 2 through a rubber opening 20 communicating with the rubber passageway 19. As a consequence, the cords 2 are incessantly coated with the rubber material so that a cylindrical hose 21 is produced having the cords 2 embedded therein as shown in FIG. 9. Into the rubber opening 20 is fed the rubber material through a feed tube 22 (see FIG. 1) communicating with a rubber extruder not shown in the drawings. In the case that a plurality of rubber extruders are used for extruding rubber material, the rubber material is to be fed to a plurality of rubber openings 20. On the front portion of the second block 17 is securely mounted a support member 23 having one end portion of an elongated bellows 24 mounted thereon. In the combination of the first and second blocks 16 and 17 is formed an air passageway 25 communicating at its one end with a compression air source and at the other end with a space 27 defined by the inner surface of the cylindrical hose 21 and the outer surface of the bellows 24. Compression air produced by the compression air source is introduced into the space 27 through the air passageway 25 so that the inner surface portion of the cylindrical hose 21 is prevented from coming into contact with the outer surface portion of the bellows 24. Downstream of the rubber coating mechanism 15 is positioned a cylindrical retaining pipe 28 having at its rear end a support member 29 to which the other end portion of the bellows 24 is securely attached. Numeral 30 denotes a festoon portion of the cylindrical hose 21. The variation of the length of the bellows 24 enables the dangling amount of the festoon portion 30 to be varied. In this instance, air in the bellows 24 can enter the space 27 defined by the inner surface portion of the cylindrical hose 21 and the outer surface portion of the bellows 24 through air openings not shown but formed in the bellows 24, and conversely air in the space 27 can enter the bellows 24 through the air openings. The rear end portion of the retaining pipe 28 extends partially in the cylindrical hose 21 to retain the hose 21. At the rear end portion of the retaining pipe 28 is disposed a first retaining mechanism 31 movable axially on the retaining pipe 28 and having the cylindrical hose 21 passed therethrough. In FIG. 10 is shown the first retaining mechanism 31 comprising a frame member 33 having rollers 32, a ring member 34 securely mounted on the frame member 33, a plurality of power cylinders 35 mounted on the ring member 34 and extending radially outwardly of the ring member 34 and having a plurality of piston rods 36 projecting radially inwardly of the ring member 34, and a plurality of vacuum caps 37 mounted on the radially inner ends of the piston rods 36, respectively. The outer surface portion of the cylindrical hose 21 is thus adapted to be attracted and retained by means of the vacuum caps 37. Downstream of the first mechanism 31 is arranged a severing machine 38 which is adapted to sever the cylindrical hose 21 at a predetermined length from the leading end thereof with radar beam or rotary cutters. As shown in FIG. 11, a pair of first clamp members 39 and 40 respectively having clamping portions 39a and 40a are disposed upwardly and downwardly of the retaining pipe 28 downstream of the severing machine 38. The first clamp members 39 and 40 are driven to be reciprocated by means of suitable drive means not shown in the drawings. On the clamping portions 39a and 40a of the first clamp members 39 and 40 are respectively formed protrusions 41 and 42 projecting toward each other to be brought into mating engagement with a pair of recesses 43 and 44 formed in the retaining pipe 28, respectively. When the first clamp members 39 and 40 are driven to be moved in the position closest to the retaining pipe 28, the protrusions 41 and 42 formed in the first clamp members 39 and 40 are respectively brought into mating engagement with the recesses 43 and 44 formed in the retaining pipe 28 in order to fixedly retain the retaining pipe 28. Downstream of the first clamp members 39 and 40 is disposed a second retaining mechanism 45 movable axially of the retaining pipe 28 and having the cylindrical hose 21 passed therethrough. The construction of the second retaining mechanism 45 is substantially identical to that of the first retaining mechanism 31 so that the description of the second retaining mechanism 45 will be omitted. A pair of second clamp members 46 and 47 having respectively clamping portions 46a and 47a are disposed upwardly and downwardly of the retaining pipe 28 downstream of the second retaining mechanism 45. The constructions of the second clamp members 46 and 47 are also substantially identical to those of the first clamp members 39 and 40 so that the description of the second clamp members 46 and 47 will be omitted. Designated by numeral 48 is retaining means constituted as a whole by the above mentioned retaining pipe 28, first and second retaining mechanisms 31 and 45, and clamp members 39, 40, 46 and 47.

Operation of the apparatus thus constructed and arranged will be described in detail hereinafter.

The cords 2 unwound from the respective reels 1 are caused to gather at a first roller 6 to turn the movement direction of the cords 2 as shown in FIG. 1 and thereafter passes between control rollers 7 and 8. The cords 2 are then travelled through the apertures 12, 13 and 14 of the guide members 9, 10 and 11 so as to be able to smoothly enter a rubber coating mechanism 15. In the rubber coating mechanism 15, the cords 2 pass through the cord passageways 18 of the first block member 16 and then pass through the rubber passageway 19 of the second block member 17. At this time, rubber material is incessantly fed in the rubber passageway 19 through the feed tube 22 and the rubber opening 20 so that the cords 2 are coated with the rubber material while passing through the rubber passageway 19. As a consequence, the cylindrical hose 21 having the cords 2 embedded therein is produced incessantly. While the cylindrical hose 21 is produced ceaselessly as just mentioned above, the cylindrical hose 21 is dangled as shown in FIG. 1 and thus stored temporarily while being passed between the rubber coating mechanism 15 and the first retaining mechanism 31. Even in the event that cylindrical hose 21 is supplied intermittently to the following step there is no necessity that operation of an apparatus for manufacturing the hose 21 be stopped for the reason that the hose 21 is stored temporarily as mentioned above.

Figure 12:
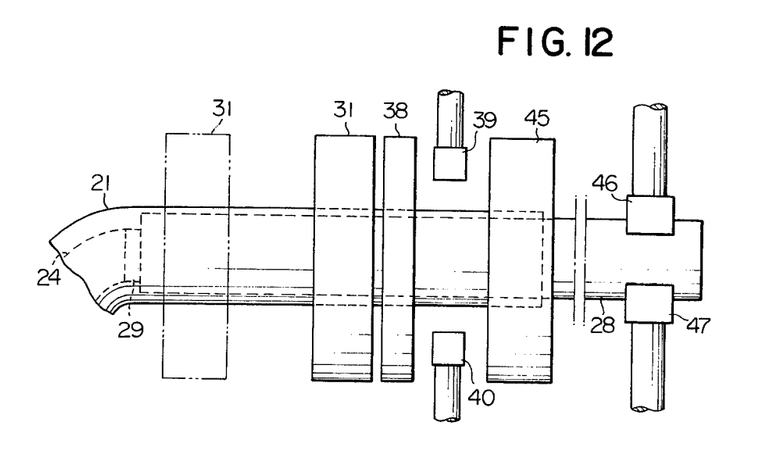
FIGS. 12 and 13 are fragmentary schematic views, to an enlarged scale, showing portions of the apparatus shown in FIG. 1 at operational stages of retaining means forming part of the embodiment illustrated in FIG. 1.
Figure 13:
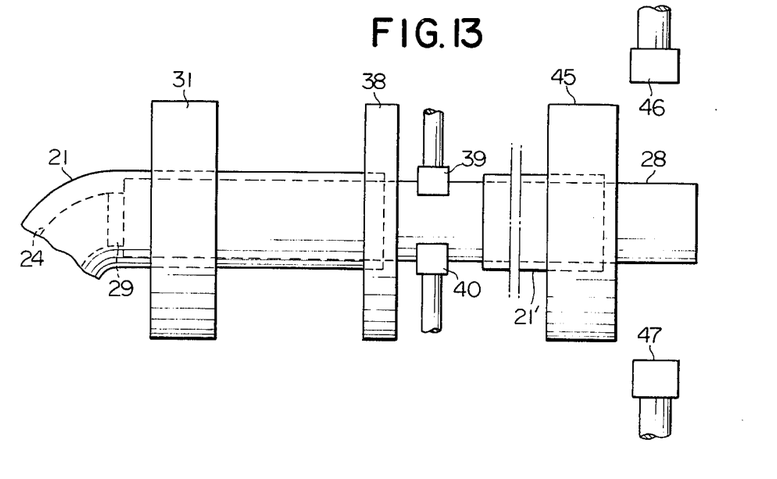

Description of the step of severing intermittently the cylindrical hose 21 into predetermined lengths and taking out the severed hoses 21' from the retaining pipe 28 will be described hereinafter. As shown in FIG. 1, the retaining pipe 28 fixedly retained by the second clamp members 46 and 47 allows the cylindrical hose 21 to partially be received thereon, and the outer portion of the hose 21 is attracted and retained by the vacuum caps 37 of the first retaining mechanism 31. The first retaining mechanism 31 thus retaining the cylindrical hose 21 is initially moved axially of the retaining pipe 28 from its phantom line position to its solid line position close to the severing machine 38 as shown in FIG. 12. The axial movement amount of the first retaining mechanism 31 is substantially equal to the length of the cylindrical hose 21 which is to be severed by the severing machine 38. The leading outer portion of the cylindrical hose 21 is then retained by the second retaining mechanism 45, and the hose 21 is released from the first retaining mechanism 31. The first retaining mechanism 31 is thereafter moved rearwardly axially of the retaining pipe 28 to the initial position thereof as shown in phantom lines in FIG. 12 and again retains the outer surface portion of the hose 21. The cylindrical hose 21 thus retained by means of the first and second retaining mechanisms 31 and 45 is severed into the predetermined length from the leading end thereof by the severing machine 38. The second retaining mechanism 45 retaining the severed hose 21 is moved forwardly axially of the retaining pipe 28 and is then stopped at the rear sides of the second clamp members 46 and 47. As a consequence, the retaining pipe 28 between the trailing end of the hose 21' severed from the cylindrical hose 21 and the leading end of the cylindrical hose 21 not severed is exposed so that the first clamp members 39 and 40 are able to clamp directly the retaining pipe 28. When the first clamp members 39 and 40 clamped directly the retaining pipe 28, the second clamp members 46 and 47 move away from the retaining pipe 28 not to interfere with the axial movement of the second retaining mechanism 45 as shown in FIG. 13. Thereafter, the second retaining mechanism 45 is further moved forwardly axially of the retaining pipe 28 so that the severed hose 21' is taken out from the retaining pipe 28 and is transferred into a stock container not shown in the drawings. The second retaining mechanism 45 is then moved rearwardly axially of the retaining tube 28 to the initial position thereof as shown in solid line in FIG. 12. When the second clamp members 46 and 47 again clamp directly the retaining pipe 28, the first clamp members 39 and 40 move away from the retaining pipe 28. The above operation is one cycle of the process of manufacturing a carcass band according to the present invention as shown in FIG. 1. The above mentioned cycle will be repeated to produce intermittently the hose 21' severed into the predetermined length which is employed as a carcass band in producing a radial tire.

As previously described, there are advantages in accordance with the present invention such that carcass bands are produced with high quality and the process of manufacturing a carcass band carcass is incessantly carried out with a high operational efficiency without stopping an apparatus therefor.

What is claimed is:

1. A process of manufacturing carcass bands which are reinforced by cords and are employed in fabricating a radial tire, comprising of the steps of unwinding a plurality of cords from a plurality of reels, respectively, travelling said cords through apertures formed in guide members and entering a rubber coating mechanism, coating said cords with rubber material by means of said rubber coating mechanism to produce incessantly a cylindrical tube having said cords embedded therein, storing said cylindrical tube temporarily between its leading end portion and said rubber coating mechanism, receiving said leading end portion of said cylindrical tube on an axially elongated retaining member having rear and front ends, retaining said leading end portion of said cylindrical tube and moving said leading end portion retained by means of a first retaining mechanism to a position in which said cylindrical tube is severed, severing said cylindrical tube into a predetermined length from the leading end thereof while producing incessantly said cylindrical tube and storing temporarily said tube between said rubber coating mechanism and said rear end of said axially elongated retaining member, and taking out from said axially elongated retaining member the severed tube while producing incessantly said cylindrical tube and storing temporarily said tube between said rubber coating mechanism and said rear end of said axially elongated retaining member.

2. A process of manufacturing carcass bands as set forth in claim 1, in which said cylindrical tube is stored temporarily by dangling said cylindrical tube between said rubber coating mechanism and said rear end of said axially elongated retaining member.

3. A process of manufacturing carcass bands as set forth in claim 2, said cylindrical tube is dangled by means of an bellows extending between said rubber coating mechanism and said axially elongated retaining member.

4. A process of manufacturing carcass bands as set forth in claim 1, in which said leading end portion of said cylindrical tube is retained and moved by attracting and holding an outer surface portion of said leading end portion by means of vacuum caps of said first retaining mechanism, the first retaining mechanism being movable along said axially elongated retaining member between said rear end of said retaining member and said position, and said severed tube is taken out by attracting and holding an outer surface portion of said severed tube by means of vacuum caps of said second retaining mechanism, the second retaining mechanism being movable along said retaining member between said position and said front end of said retaining member.

* * * * *